United States Patent [19]

Szpakowski

[11] Patent Number: 5,108,350
[45] Date of Patent: Apr. 28, 1992

[54] CONDUIT CARRIER CHAIN
[75] Inventor: Joey R. Szpakowski, Valparaiso, Ind.
[73] Assignee: A&A Manufacturing Co., Inc., New Berlin, Wis.
[21] Appl. No.: 666,107
[22] Filed: Mar. 6, 1991
[51] Int. Cl.⁵ .............................................. F16G 13/16
[52] U.S. Cl. ................................. 474/207; 474/224; 59/78.1
[58] Field of Search ............... 474/206, 207, 219, 220, 474/223, 224, 225; 59/78.1

[56] References Cited

U.S. PATENT DOCUMENTS

| | | | |
|---|---|---|---|
| 2,230,457 | 2/1941 | Hollmann et al. | 474/224 |
| 3,448,953 | 6/1969 | Kurlandsky | 248/51 |
| 3,448,954 | 6/1969 | Kurlandsky | 248/51 |
| 3,503,578 | 3/1970 | Kurlandsky | 248/51 |
| 3,503,579 | 3/1970 | Kurlandsky | 248/51 |
| 3,504,864 | 4/1970 | Kurlandsky | 248/51 |
| 3,664,619 | 5/1972 | Heidrich et al. | 248/51 |
| 3,759,035 | 9/1973 | Schmidberger | 59/78.1 |
| 3,779,003 | 12/1973 | Boisevain et al. | 59/78.1 |
| 3,782,670 | 1/1974 | Kielma | 248/51 |
| 3,921,388 | 11/1975 | Loos et al. | 59/78.1 |
| 4,104,871 | 8/1978 | Moritz | 59/78.1 |
| 4,129,277 | 12/1978 | Tenniswood | 248/51 |
| 4,272,952 | 6/1981 | Graham | 474/224 X |
| 4,311,293 | 1/1982 | Tenniswood | 248/49 |
| 4,392,344 | 7/1983 | Gordon | 59/78.1 |
| 4,499,720 | 2/1985 | Klein | 59/78.1 |
| 4,570,437 | 2/1986 | Moritz | 59/78.1 |
| 4,590,961 | 5/1986 | Schumann | 137/355 |
| 4,625,507 | 12/1986 | Moritz et al. | 59/78.1 |
| 4,626,233 | 12/1986 | Moritz | 474/206 |
| 4,658,577 | 4/1987 | Klein | 59/78.1 |

OTHER PUBLICATIONS

Applicant's Exhibit 1, "Kabelschlepp Information Neu! Energieführung Quattroflex", (2 pages), admitted prior art, of Kabelschlepp GmbH, Siegen, Germany.
Applicant's Exhibit 2, "igus E-Chains ™ E-Tubes ™ Innovative Cable and Hose Carriers", pp. 1-15, 18-27, admitted prior art, of Igus Bearings, Inc., East Providence, R.I.
Applicant's Exhibit 3, "Gleason Reel Plastitrak Lightweight Cable/Hose Control For Equipment in Motion", pp. 1-12, admitted prior art, of Gleason Reel, Mayville, Wis.
Applicant's Exhibit 4, "Quality Features Aero-Trak Series A600, A700, A800 and A900", (4 pages), admitted prior art, of Aero-Motive, Kalamazoo, Mich.
Applicant's Exhibit 5, "Kabelschlepp Energieführungen of Energieführungsschläuche Conduflex", (8 pages), admitted prior art, Kabelschlepp GmbH, Siegen, Germany.
Applicant's Exhibit 6, "Catene Portacavi Nylon Brevetti Stendalto", (12 pages), admitted prior art, of Brevetti Stendalto S.p.A., Milan, Italy.
Applicant's Exhibit 7, "Circular Nylon Drag Chain Brevetti S.p.A., Stendalto", (2 pages), admitted prior art, of Brevetti Stendalto, Milan, Italy.
Applicant's Exhibit 8, "Hennig Nylotrak ® Cable Carriers", pp. 1-8, admitted prior art, of Rockford, Ill.
Applicant's Exhibit 9, "Kabelschlepp Energieführungen admitted Energieführungsketten mit Kunststoff-Kettenbändern", (14 pages), prior art, of Kabelschlepp GmbH, Siegen, Germany.
Applicant's Exhibits 10-12, three Photographs showing the Kabelschlepp KR130 0900K Cable Carrier.
Applicant's Exhibits 13-15, three Photographs showing the Igus 40.01.150 Cable Carrier.

Primary Examiner—William P. Neuder
Attorney, Agent, or Firm—Quarles & Brady

[57] ABSTRACT

A conduit carrier chain having end-to-end pivotally connected link plate sides has a stop element between each pair of pivotally connected link plate ends. The stop element has two lateral sides which each interfit with one of the two pivotally connected ends to limit the range of angular motion of one link plate relative to the other. The lateral sides of the stop element can be made with camber and radius stop surfaces in different positions, so that the average camber and radius of a length of chain can be adjusted for particular applications simply by changing the assembly orientation of the stop element between the two ends. A tie bar or a cover is also provided which spans the sides of the chain and has pockets which fit over noses on the link plates to rigidly connect the sides of the chain.

19 Claims, 9 Drawing Sheets

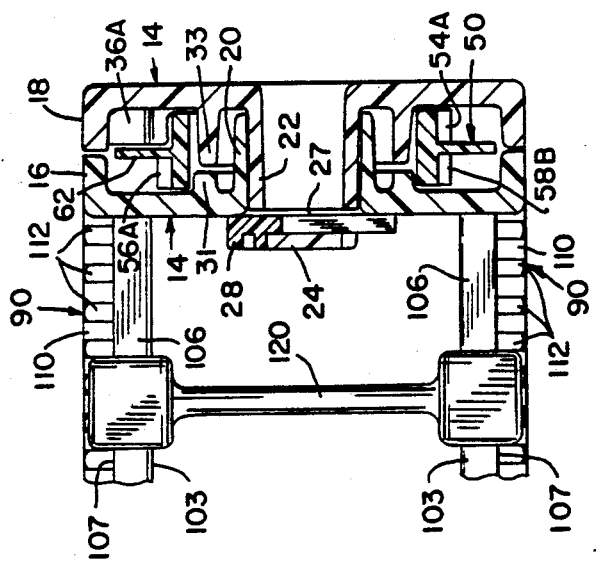
FIG. 4
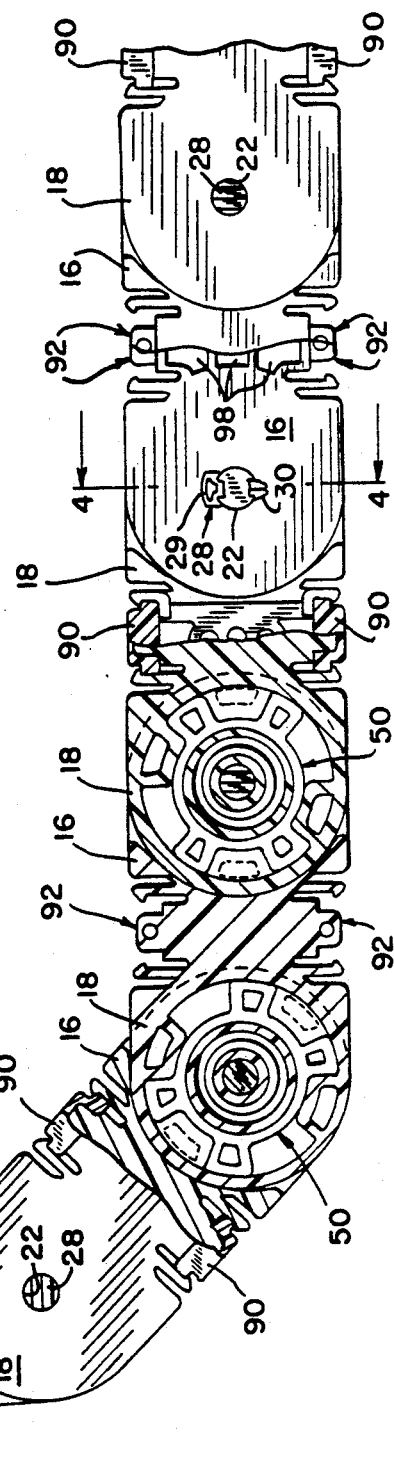
FIG. 2
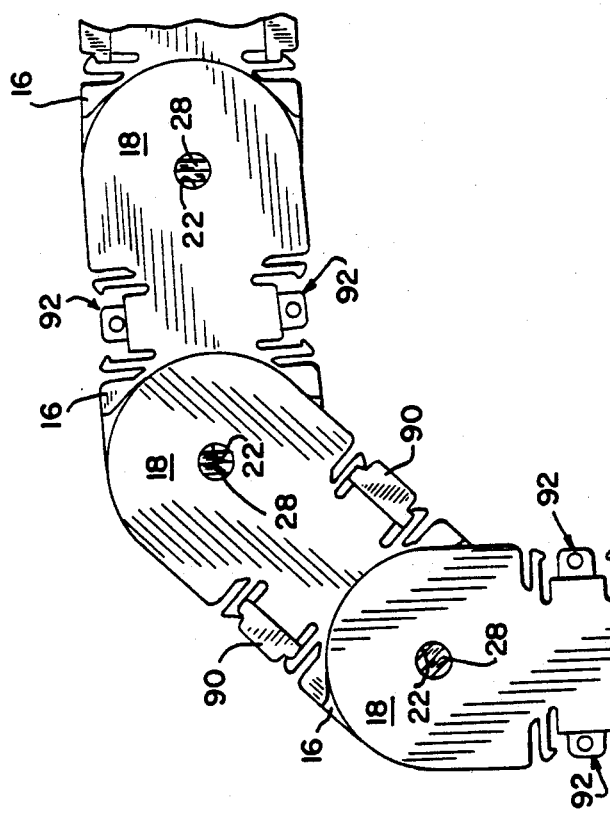

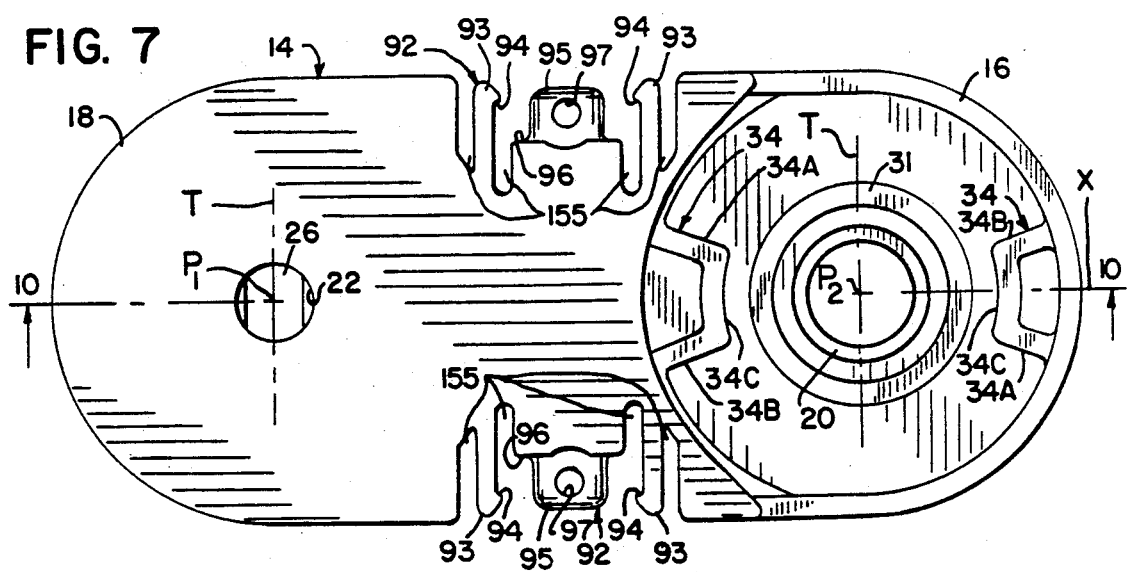
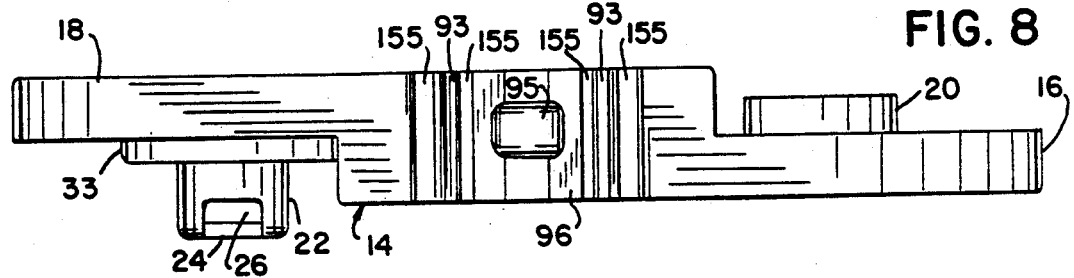
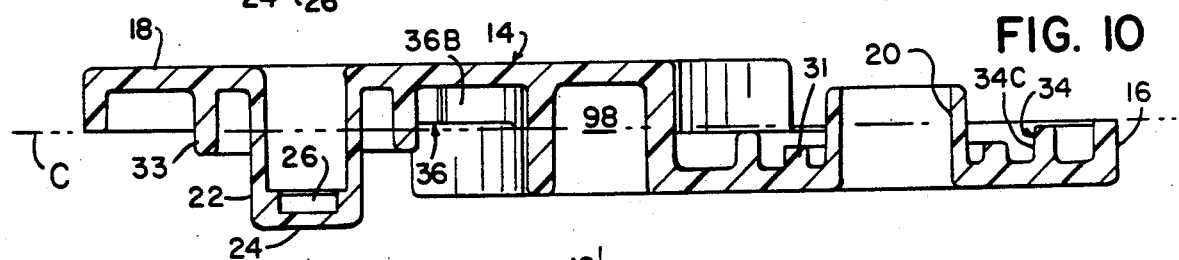
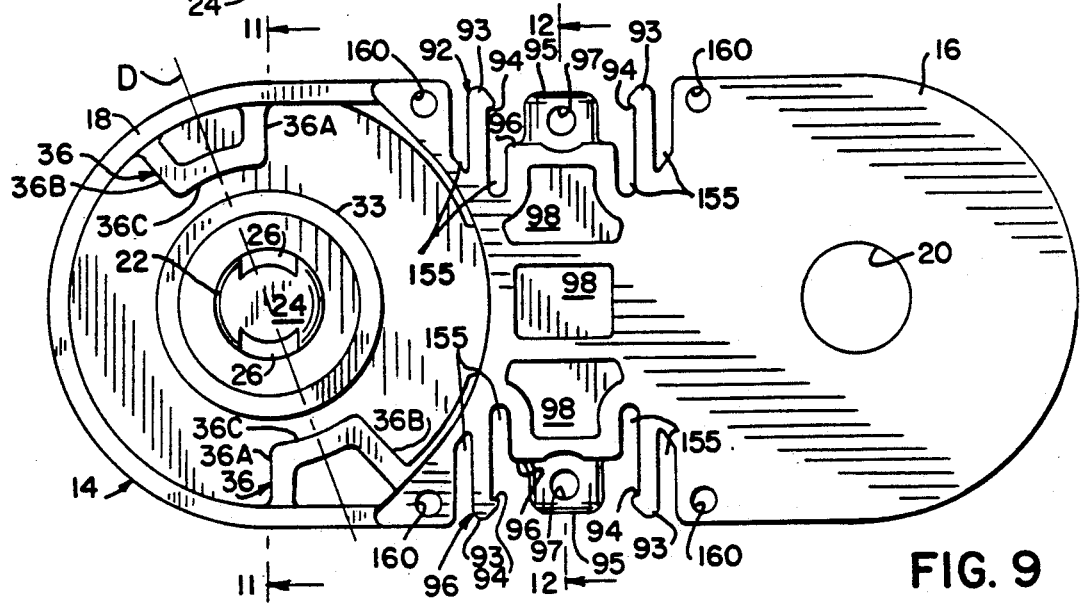

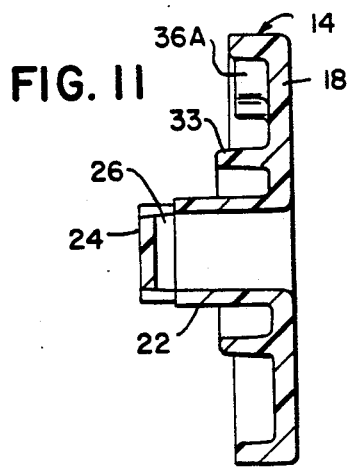
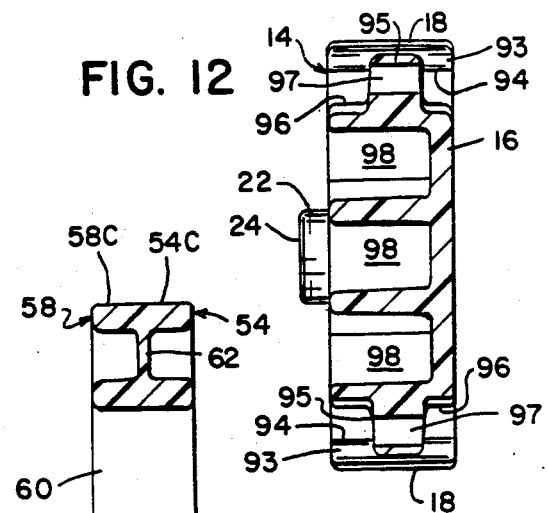
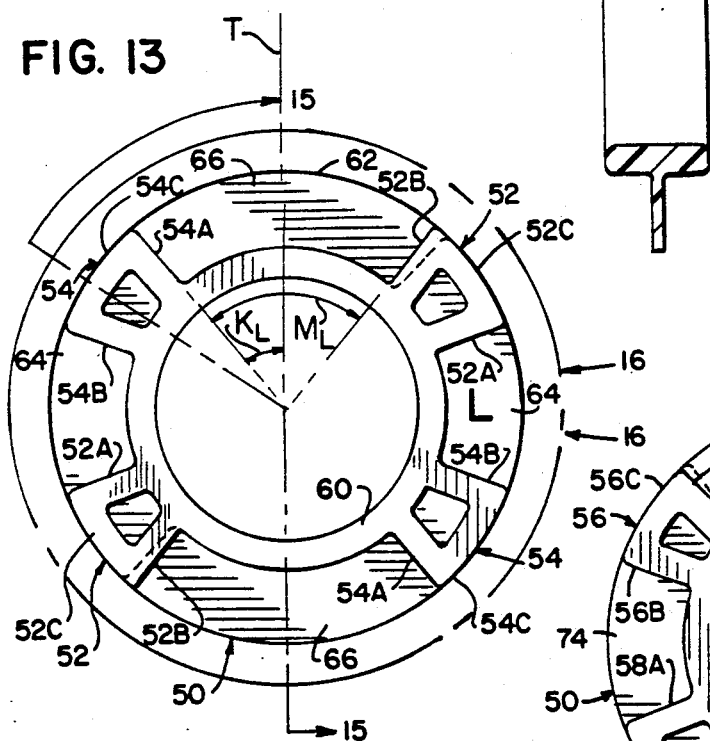
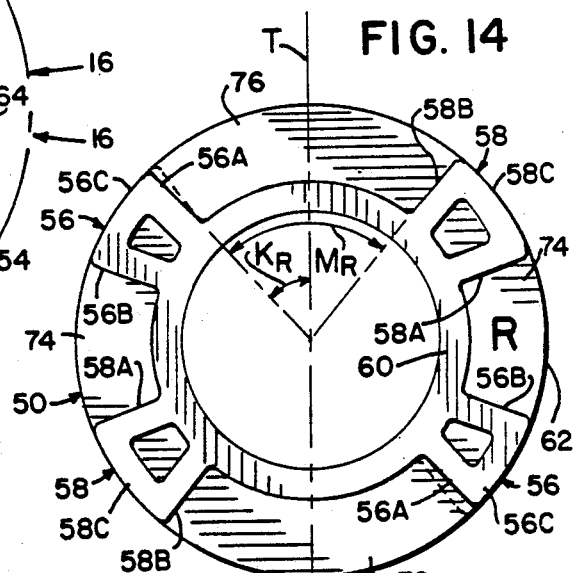
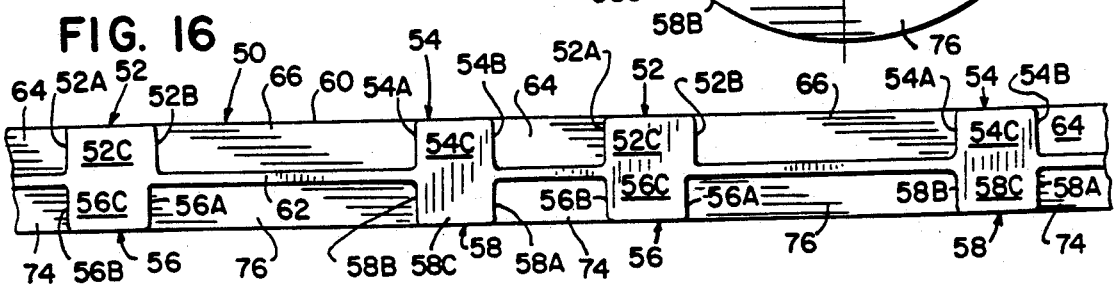

CONDUIT CARRIER CHAIN

BACKGROUND OF THE INVENTION

1. Background of the Invention

This invention relates to self supporting carriers for routing flexible conduit.

2. Discussion of the Prior Art

Conduit carrier chains for guiding one or more cables, hoses or other flexible media (collectively referred to herein as conduits) from one location to a relatively movable location are well known. As applied to machine tools, the carrier is typically attached at one end to a stationary base or frame and at its other end to a mobile table or other member that moves back and forth in a relatively straight line.

Conduits are supported inside the carrier chain, which typically has a limited range of angular motion of one link relative to the next. This range may typically be from about 180° to approximately 135° or less. Between the base and the table, the chain extends from one end and supports itself in one relatively straight span along the line of motion, and curves at a certain radius to another relatively straight span that doubles back on the first span and extends to the other end of the carrier. As the table moves back and forth, the span lengths change as the chain follows the radius.

The precise limits of the range of link-to-link angular motion are chosen so that the chain is self supporting in the plane of motion defined by its two spans. In a typical installation, the chain is in a vertical plane, with at least its lower span substantially horizontal (the upper span may be inclined) and with the spans above one another. The chain is cantilevered out from its lower end along a lower span to the radius, which curves back on the lower span to define the upper span. The lower span supports the weight of the chain and all the conduits it carries for the entire length of the chain, which is determined by the length of the motion to be accommodated. The upper span supports the weight of itself and the conduits in the upper span. Such chains are therefore typically made with a certain unloaded concavity or "camber" upwardly so that when they are loaded with the cable and/or hoses and cantilevered from their lower ends, they are generally horizontal rather than sagging excessively from horizontal. Thus, the upper limit of the range of link-to-link angular motion may be somewhat less than 180° to provide the camber, depending upon the length of motion to be accommodated and the weight of the carrier chain and conduits.

Cable carrier chains are also made for a certain radius, which determines the precise limit at the low end of the link-to-link angular motion. The minimum radius determines the distance that the two spans of the carrier are spaced apart, which may vary from application to application based upon space and end mounting considerations.

Since the length of motion, weight of conduits, end mounting, and available space can vary considerably from application to application, cable carriers have typically been specially engineered for each application. In addition to being relatively expensive and time consuming, it has been difficult in prior art carriers to adjust the camber and radius of carriers so as to fit particular applications. The difficulty of applying cable carriers to specific applications has also contributed to such carriers typically being sold as assemblies or completed installations. Consequently, a result has been inflexibility in adapting such carriers to other applications where they may otherwise be useful.

SUMMARY OF THE INVENTION

The invention provides a chain for carrying flexible conduit from one point to a relatively movable point which overcomes the above problems. The chain has a plurality of links which each have a link plate at a lateral side thereof. Each link plate has a pair of opposed ends, and each end is connected to an end of a link plate on the corresponding side of the next adjacent link to pivot about a laterally extending axis. A stop element is positioned between the pivotally connected ends of end-to-end connected link plates which is separate and distinct from both link plates. The stop element has two lateral sides: one that interfits with one of the pivotally connected ends; and an opposite lateral side that interfits with the other pivotally connected end. The connection between the pivotally connected ends provided by the stop element limits the angular motion between the ends about the laterally extending pivot axis. The stop element can be made so that its sides are different. Therefore, the camber and/or radius of the chain can be changed merely by flipping the stop element relative to the pivotally connected ends. Moreover, a length of chain can be made with any of a number (more than two) of radii and/or cambers by changing the radius and/or camber according to the assembly orientation and/or type of stop means used from pivot joint to pivot joint.

In an especially useful form, each stop element has a camber surface and a radius surface on each of its lateral sides. Each end has a camber surface for abutting the camber surface on the corresponding lateral side of the stop means in a straight position and a radius surface for abutting the radius surface on the corresponding lateral side of the stop means in a curved position. By changing the relative positions of the camber and stop surfaces from side to side of the stop element, different combinations of radii and/or cambers are attainable by merely assembling the stop element in one orientation or the other.

In an especially useful aspect, the camber surface on each side of the stop means is angularly spaced apart from the radius surface by a travel pocket. The travel pocket on one side of the stop means is made different in size and/or position from the travel pocket on the other side of the stop means, to vary the camber and/or radius from side to side. Preferably, both sides of the stop means can be made to interfit with either pivotally connected end for maximum flexibility of design and application. Moreover, each side of the stop means can be made to define a locator pocket between camber and radius surfaces for closely interfitting with the camber and radius surfaces on one or on either pivotally connected end. This can advantageously be done to provide a reference assembly position of the stop element from which adjustments to the camber and radius of a length of chain can be made. Providing a reference can be further facilitated by assembling the locator pockets on either side of the stop element to receive digits on only one of the ends of the link plate.

Preferably, for additional rigidity, two or more angularly opposed locator pockets and a corresponding number of angularly opposed travel pockets are provided on each side of the stop element. Each end has a corresponding number of digits to fit into either the locator pockets or the travel pockets on the corresponding side of the stop means. The chain can also be provided with two or more sides for additional rigidity, stability and load carrying capacity. Tie bars or covers can also be provided which span the sides to further stabilize the chain and support and compartmentalize conduits therebetween.

In yet another aspect, a nose extends transversely from each transverse side of each link plate at the sides of a link. A tie bar or cover spans between the noses on each transverse side of the link, and defines a pocket which fits closely over each nose. Snap action connectors are provided for securing the tie bars or covers over the noses. Multiple pockets can be provided along the length of the tie bars or covers and the tie bars or covers can be cut to length to provide a desired spacing, in increments of the spacing between corresponding points of the pockets, between the lateral sides of the link.

BRIEF DESCRIPTION OF THE DRAWINGS

FIG. 2 is a side elevation view of the conduit carrier chain of FIG. 1 with portions broken away;

FIG. 4 is a sectional view taken from the plane of the line 4—4 of FIG. 2;

FIG. 7 is a side elevation view of the outside side of a link plate for the conduit carrier chain of FIG. 1;

FIG. 8 is a bottom elevation view of the link plate of FIG. 7, the top elevation view being the mirror image thereof;

FIG. 9 is a side elevation view of the inside side of a link plate for the conduit carrier chain of FIG. 1;

FIG. 10 is a sectional view taken along the plane of the line 10—10 of FIG. 7;

FIG. 11 is a sectional view taken along the plane of the line 11—11 of FIG. 9;

FIG. 12 is a sectional view taken along the plane of the line 12—12 of FIG. 9;

FIG. 13 is a left side elevation view of a stop element for the conduit carrier chain of FIG. 1;

FIG. 14 is a right side elevation view of the stop element of FIG. 13;

FIG. 15 is a sectional view taken along the line 15—15 of FIG. 13;

FIG. 16 is an unwrapped side elevation view as viewed along the curve 16—16 of FIG. 13;

DETAILED DESCRIPTION OF THE PREFERRED EMBODIMENTS

Figure 1:
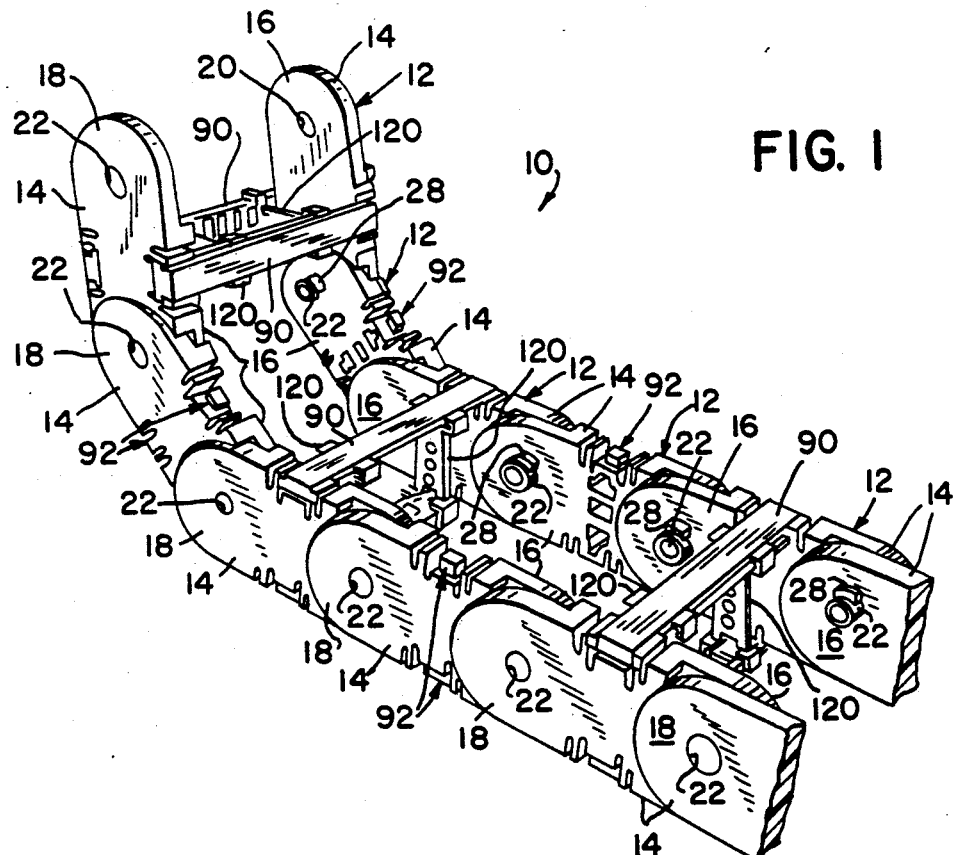
FIG. 1 is a perspective view of a conduit carrier chain of the invention.
Figure 5:
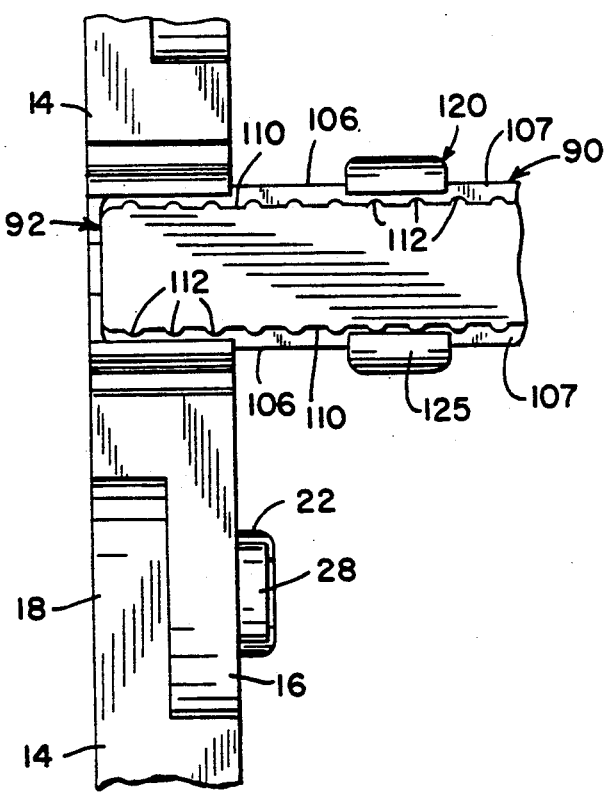
FIG. 5 is a top plan view illustrating the connection of a tie bar to a link plate and of one end of a separator to a tie bar.

FIG. 1 illustrates a conduit carrier chain 10 having a plurality of links 12 which are pivotally connected end-to-end to one another. The chain 10 is particularly adapted for guiding one or more cables, hoses or other types of pneumatic, vacuum, hydraulic, fiber optic, electrical or other conduits from one location to a relatively movable location. The chain 10 is typically attached at one end to a stationary base or frame (not shown) and at its other end to a movable table or other member (not shown) that moves back and forth in a relatively straight line.

The conduits are flexible and supported inside the chain 10, which can bend significantly within limits from a substantially straight position (although with a camber as further discussed below) in only one direction to a curved position as shown in FIG. 1. As shown in FIG. 1, the chain 10 can only bend upward in the direction from right to left from the straight position to the curved position.

Also, particularly in installations where a straight span of the chain is horizontal as shown in FIG. 1, the chain is made so that its straight spans have a certain unloaded camber which produces a concavity upward along the straight span as shown in FIG. 1. The upward concavity or camber is provided so that when the chain 10 is loaded with conduits and supported from its ends, it sags to being generally horizontal rather than sagging excessively from horizontal to being inclined below horizontal.

As will be further described below, the preferred embodiment of the invention can be provided with a camber ranging from one inch in a four foot length of chain to two inches in four feet. This camber dimension is typically measured by placing a four foot length of the chain on a flat surface with the concavity produced by the camber facing down and measuring the distance that the carrier chain is raised up from the flat surface in the middle of the four foot length.

Each link 12 includes a pair of laterally spaced apart link plates 14. Each link plate 14 in the preferred embodiment is identical to all the others, although they could differ in construction.

Referring particularly to FIGS. 2, 3, 4 and 7-10, each link plate 14 has a pair of opposed ends 16 and 18. Each end 16 is formed with a bushing 20 centered on a pivot axis at one end of the link 12. The other link plate end 18 is formed with a tubular stub shaft 22 that fits inside of the bushing 20 of the next adjacent link plate 14 on the corresponding side of the chain 10. The stub shafts 22 extend from the link plate ends 18 toward the center of the chain 10. Note that each link 12 has a fore and an aft end, and that one link plate 14 of each link 12 extends fore to aft from end 16 to end 18, and that the other link plate 14 of each link 12 is reversed fore to aft, extending fore to aft from end 18 to end 16. Thus, the same link plate 14 can be used at both sides of the chain 10.

The stub shafts 22 fit within the bushings 20 with a clearance so as to create a pivotal connection between adjacent links about a laterally extending pivot axis at the corresponding end of the links 12, which is coaxial with the stub shafts 22 and bushings 20 at that end. Each tubular stub shaft 22 has a closed end 24 and a channel 26 is provided through the end of the stub shaft 22 just inside of the closed end 24. A spring clip 28 (FIGS. 2, 3, 4, 20 and 21) is inserted through the channel 26 and locked therein by means of its hooked leg 30 catching behind the shoulder of the channel 26 which is distal from the enlarged end 29 of the spring clip. The outer, flat side surface 27 of each spring clip 28 bears upon the inside surface 32 of each end 16. Thereby, the end-to-end pivotal connection between adjacent link plates 14 is secured.

Figure 3:
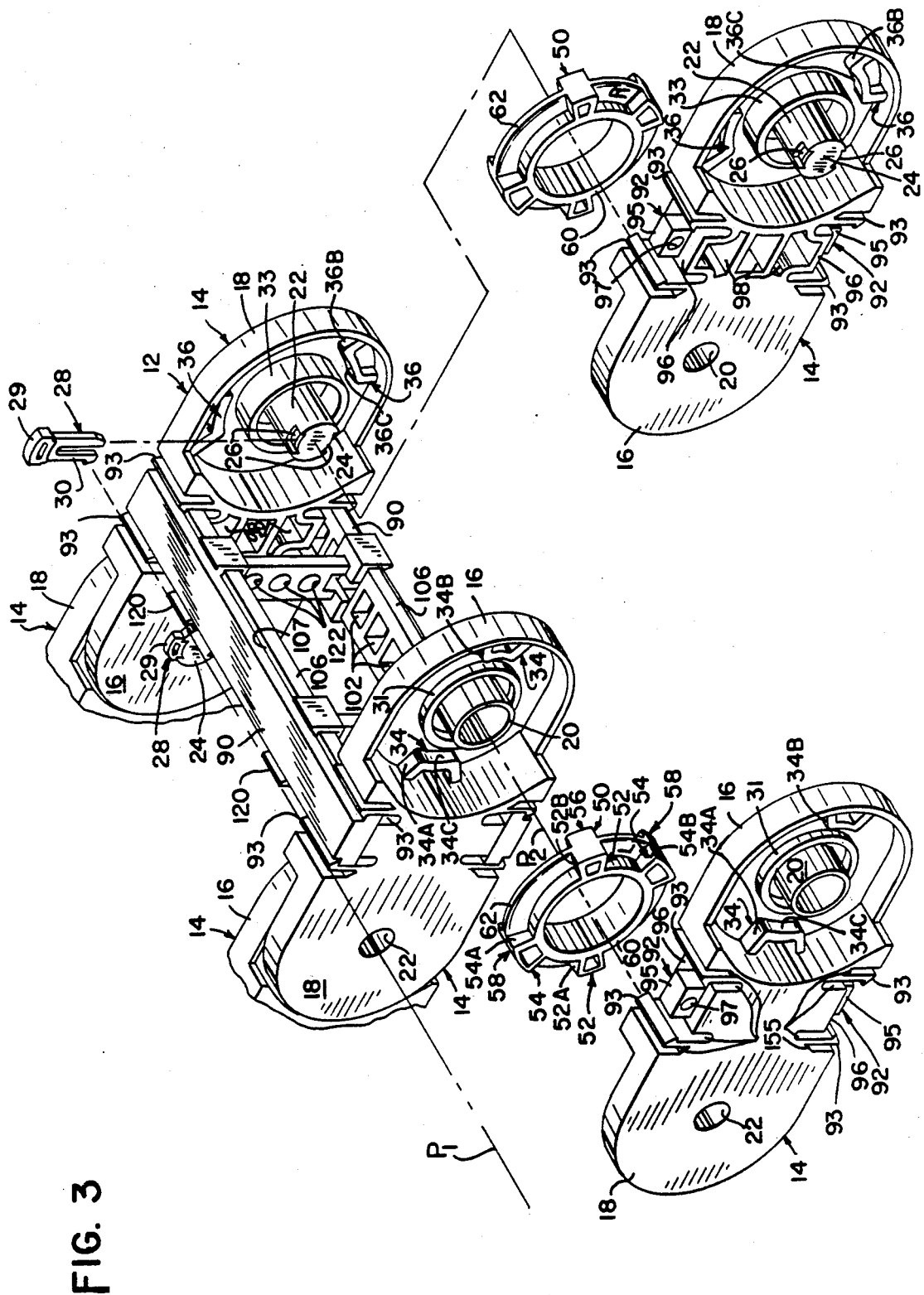
FIG. 3 is an exploded perspective view illustrating a link for the conduit carrier chain of FIG. 1.

Each link 12 has a laterally extending pivot axis at each of its ends which corresponds with the pivot axis of the next adjacent link at the corresponding end. In FIG. 7, the axes at the two ends of the link plate 14 illustrated extend into the paper and are identified by $P_1$ and $P_2$. Note that $P_1$ in the links shown in FIG. 7 is at end 18 and $P_2$ in the links shown in FIG. 7 is at end 16. This corresponds to the $P_1$ and $P_2$ axes positions shown in FIG. 3 respecting the left side link plate 14 illustrated there through which the axes extend. As shown in FIG. 3, looking at the entire link 12 made up of two end-opposed, spaced apart link plates 14, $P_1$ extends through the end 18 of the left link plate 14 and through the end 16 of the right link plate 14, and $P_2$ extends through the end 16 of the left link plate 14 and through the end 18 of the right link plate 14. Referring particularly to FIGS. 3, 7 and 9, each end 16 has a pair of angularly opposed locator digits 34 and each end 18 has a pair of angularly opposed travel digits 36. Line X in FIG. 7 between $P_1$ and $P_2$ defines a longitudinal axis, and the digits 34 on ends 16 are aligned along the longitudinal axis L and symmetrical thereabout. The digits on end 18 on the other hand, are centered along and symmetrical about a line D (FIG. 9) which is radial to $P_1$ and at an angle $\partial$ to the longitudinal axis X.

Each of the digits 34 and 36 are approximately the same size and subtend an angle of about 40°. Each digit 34 and 36 also has a radius surface and a camber surface. On the digits 34, the radius surfaces are denoted 34A and the camber surfaces are denoted 34B, and on the digits 36 the radius surfaces are denoted 36A and the camber surfaces are 36B.

In the preferred embodiment, two digits 36 and two digits 34 are shown. However, as will become apparent from the following description, only one radius surface and one camber surface is necessary and therefore only one digit is necessary on each end of the link plate 14. Two digits are provided in the preferred embodiment for additional strength. More than two (e.g., 3, 4, 5 or more) could also be provided if desired for additional rigidity, as further described below. However, the maximum number of digits that could be used is limited by the range of angular motion between link plates that is required.

Each digit 34 and 36 has a reinforcing wall 34C and 36C respectively spanning the radially inner ends of its walls which define the respective radius surfaces 34A and 36A and camber surfaces 34B and 36B. It should be noted that each of the radius and camber surfaces 34A and 34B and 36A and 36B extend radially and laterally so as to provide an abutment. For plastic molding considerations, the digits 34 and 36 are hollow, as best shown in FIGS. 3 and 10. Otherwise, if the digits 34 and 36 were made completely solid, the resulting relatively large thickness of plastic material in the area of the digits may result in excessive shrinkage during a plastic molding process used to make the link plates 14.

As best shown in FIG. 10, the digits 34 and 36 do not extend past the lateral centerline C of each link plate 14. Thus, when two link plates 14 are assembled together end-to-end with the stub shaft 22 of one extending into the bushing 20 of the other, the digits 34 and 36 do not directly engage one another. Rather, a discrete stop element 50 which is separate and distinct from any of the link plates 14 fits between the ends 16 and 18 of the end-to-end assembled link plates 14 to engage the digits 34 on one side and the digits 36 on the other side of its lateral centerline.

Referring to FIGS. 3 and 13–16, a stop element 50 resides between each set of end-to-end assembled ends 16 and 18. Each stop element 50 in the preferred embodiment can be made identically and is in the general form of an annular disc, having an L lateral side and an R lateral side. Two pairs of angularly opposed ears 52 and 54 are formed on the L side of the stop element 50 and two pairs of angularly opposed ears 56 and 58 are formed on the R side of the stop element 50. Each ear 52, 54, 56 and 58 presents a radially extending radius surface 52A, 54A, 56A and 58A, respectively, and a radially extending camber surface 52B, 54B, 56B and 58B. A bridging wall 52C, 54C, 56C and 58C is provided adjoining the radially outer ends of the walls defining the surfaces 52A and B, 54A and B, 56A and B and 58A and B, respectively, and a tubular laterally extending flange 60 adjoins the radially inner ends of the walls defining the radius and camber surfaces of the digits 52, 54, 56 and 58. The digits 52, 54, 56 and 58 are therefore hollow defining open spaces within them, for plastic molding considerations as discussed above. A laterally central flange 62 resides between the digits 52 and 54 on the L side of the element 50 and the digits 56 and 58 on the R side of the element 50 for additional strength. The surfaces 52A and 54B define two locator pockets 64 on the left side of the element 50 and the surfaces 58A and 56B define two locator pockets 74 on the R side of the element 50. Surfaces 54A and 52B define two angularly opposed travel pockets 66 on the L side of the element 50 and surfaces 56A and 58B define two angularly opposed travel pockets 76 on the R side of the element 50. The number of locator pockets 64, 74 on each side of the stop element 50 corresponds to the number of locator digits 34 on the end 16 and the number of travel pockets 66, 76 on each side of the stop element 50 corresponds to the number of travel digits 36 on the end 18.

The surfaces 52A and 54B, and the surfaces 58A and 56B, are preferably angularly positioned about the pivot axis, and locator pockets 64 and 74 are therefore angularly sized, to receive surfaces 34A and 34B of digits 34 between them in a light press fit. This provides a reference position in which the digits 34 are always received in locator pockets 64 or 74 in the preferred embodiment, regardless of the orientation of assembling the stop element 50 between the pivotally connected ends 16 and 18. Since the digits 34 are symmetrically on the longitudinal axis X and the locator pockets 64 are at the same angular position on the stop element 50 as the locator pockets 74, the digits 34 serve to provide a reference position for the angular orientation of the stop element 50 by orienting its locator pockets 64 and symmetrically on the longitudinal axis X. Note, however, that the locator pockets 64 could be at a different angular position on the element 50 than the locator pockets 74.

Therefore, the digits 34 of the ends 16 can preferably be received in either the locator pockets 64 on the L side of the member 50, or in the locator pockets 74 on the R side of the member 50 with a light press fit. In either case, the stop element 50 in the preferred embodiment is angularly fixed relative to the end 16. This need not necessarily be the case, as relative angular motion could be permitted between both pivotally connected ends 16 and 18 and the stop element 50 in practicing the invention.

In addition, as further described below, the two pairs of digits 34 corresponding to each pivot axis $P_1$ or $P_2$ of the chain 10 should preferably both be received in either the pockets 64 or in the pockets 74 of the two elements 50 along the corresponding pivot axis. Thus, in the preferred embodiment, the two pairs of digits 34 along each pivot axis $P_1$ or $P_2$ are received in either the locator pockets 64 or the two pairs of digits 34 are received in the locator pockets 74. In all cases in the preferred embodiment, the camber surfaces 34B of the locator digits 34 abut the camber surfaces 54B or 56B which define the respective locator pockets 64 or 74, depending upon the orientation of the stop element 50, to help determine the camber of the chain 10. Correspondingly, the radius surfaces 34A of the locator digits 34 abut the radius surfaces 52A or 58A of the respective locator pockets 64 or 74, depending upon the orientation of the stop element 50, to help determine the minimum radius achievable by the chain.

With the two pairs (assuming only two runs of link sides 14 are used to make each link 12 of the chain) of digits 34 along each pivot axis $P_1$ or $P_2$ of the chain 10 received in either the locator pockets 64 or in the locator pockets 74 of the two stop elements 50 along the corresponding pivot axis, the longitudinal axis X is oriented angularly relative to the element 50 as shown in FIGS. 13 and 14. Note that the internal bore through the element 50 defined by the flange 60 is sized to fit over the outside diameters of flanges 31 and 33 of the respective ends 16 and 18. Therefore, the element 50 is located relative to the pivot axis through the respective ends 16 and 18 with its radius and camber surfaces 52A and B, 54A and B, 56A and B, and 58A and B extending radially with respect to the pivot axis, in position to abut the corresponding radius and camber surfaces 34A and B and 36A and B of the ends 16 and 18.

A transverse axis T is also shown in FIGS. 13 and 14 which is an axis in the plane of the element 50° and 90° to the longitudinal axis X. The radius surfaces 54A on the L side of the element 50 and the radius surfaces 56A on the R side of the element 50 are positioned an angular distance $K_L$, and $K_R$, respectively, from the transverse axis T. In the preferred embodiment, for each pair of elements 50 along each pivot axis $P_1$ or $P_2$, the angular distances $K_L$ and $K_R$ are equal. These distances determine the angular position of the radius stop surfaces 54A and 56A. They are the same so as to provide the same radius from pivot axis to pivot axis, even though the camber from joint to joint may differ, as further described below.

The digits 36 along each pivot axis fit into the travel pockets 76 along the pivot axis when the digits 34 along the pivot axis are received in the locator pockets 64. Similarly, the digits 36 along each pivot axis fit into the travel pockets 66 along the pivot axis when the digits 34 along the pivot axis are received in the locator pockets 74. Since the two pairs of digits 34 along each pivot axis are assembled in either the pockets 64 or the pockets 74, the two pairs of digits 36 along each pivot axis are likewise assembled respectively into either the travel pockets 76 or into the travel pockets 66 of the two elements 50 along the corresponding pivot axis. In every case, camber surfaces 36B of the travel digits 36 abut camber surfaces 52B or 58B of the respective travel pockets 66 or 76 to help (in conjunction with the camber surfaces 34B of the locator digits 34 and the camber surfaces 54B or 56B of the respective locator pockets 64 or 74) determine the camber of the chain. Similarly, radius surfaces 36A of the travel digits 36 abut radius surfaces 54A or 56A of the travel pockets 66 or 76, to help (in conjunction with the radius surfaces 34A of the locator digits 34 and the radius surfaces 52A or 58A of the respective locator pockets 64 or 74) determine the minimum radius achievable by the chain.

As shown in FIG. 13, on the L side of the element 50, the camber surfaces 52B are located an angular distance $M_L$ clockwise from the corresponding radius surfaces 54A which define the respective travel pockets 66. This dimension locates the camber surfaces 52B on the L side of the stop element 50 and therefore determines the amount of camber which the chain 10 will have when it is assembled with the locator digits 34 received in the locator pockets 74 on the R side of the stop element 50. In other words, this dimension determines the maximum angle between end-to-end assembled link plates 14 and therefore the maximum radius of the chain 10 when the stop element 50 is oriented with the locator digits 34 in the locator pockets 74 on the R side of the stop element 50. As discussed in the background discussion, this maximum angle will typically be somewhat less than 180° so that when the chain 10 is loaded with conduits and supported from its ends, it will be stressed to being approximately horizontal, rather than sagging to being below horizontal.

On the R side of the element 50, the angular dimension $M_R$ locates the camber surfaces 58B. Although from the L side to the R side of the element 50 in the preferred embodiment the radial positioning dimensions $K_L$ and $K_R$ are equal, the camber positioning dimensions $M_L$ and $M_R$ differ somewhat, as best shown in FIG. 16. Thus, depending upon which of the pockets 66 and 76 the digits 36 ride in, different cambers are provided.

Although the cambers from side to side of the chain 10 at each pivot axis must be the same, the cambers from pivot axis to pivot axis can differ. Thereby, by providing either of two cambers along each pivot axis, the cambers can be varied from pivot axis to pivot axis to provide a range of different possible cambers over a length of the chain 10. This is extremely desirable since the weight of conduits and the length of span of unsupported chain 10 can vary greatly from one application to another.

Since the camber of a chain of the invention can be tailored to each specific application using the same parts by merely assembling the members 50 differently, a supply of the parts can be kept in inventory for subsequent use. Moreover, different elements 50 each having a value of $K_L$ and $K_R$ which differs from the corresponding value for other elements 50 can also be provided. Although the elements 50 along each pivot axis must be the same and must be assembled so as to provide the same camber and radius at each lateral side of the chain 10 along each pivot axis, the radius and/or camber from one pivot axis to the next can be varied to provide any overall radius and camber over a length of the chain 10.

In a preferred design, five different elements 50 are provided having the following dimensions and resulting radius. All the elements are approximately 2.66 inches in diameter.

TABLE 1

| $M_R$ | $M_L$ | $K_L, K_R$ | RADIUS |
|---|---|---|---|
| 57° 42' | 56° 24' | 19° | 12.25 |
| 60° 42' | 59° 24' | 22° | 10.75 |
| 66° 42' | 65° 24' | 28° | 8.50 |
| 72° 42' | 71° 24' | 34° | 7.00 |
| 83° 3' | 81° 45' | 44° 21' | 5.37 |

The radius shown in Table 1 is the minimum unloaded radius attainable with each type of element 50 assuming that only that type of element is used in the chain assembly. These dimensions, with each of the digits 34 and 36 subtending an angle of approximately 40°, produce a camber of two inches in a four foot length (with the pivot axis to pivot axis dimension approximately four inches) with all of the digits 34 received in the pockets 64, and a camber of about one inch in four feet with all of the digits 34 received in the pockets 74. This camber is measured by the amount an unloaded four foot run of chain deviates from horizontal at its center, as described above.

Thus, using the same type of element 50 throughout the chain, the camber can be varied between one inch in four feet to two inches in four feet while maintaining a constant radius from link-to-link. As mentioned above, the camber can be varied by simply assembling the digits 34 at each pivot axis in either the pockets 64 or the pockets 74. The camber could be made 1½ inches in four feet by alternating the assembly of the digits 34 between the pockets 64 and 74 from one pivot axis to the next. A camber of 1¼ inches per four feet could be obtained by assembling the digits 34 along each pivot axis in either the pockets 64 or the pockets 74 in a 2:1 ratio. Similarly, a camber of 1⅔ inches per four feet could be obtained by assembling the digits 34 in the pockets 64 relative to the pockets 74 in a 1:2 ratio.

Thus, it should be apparent that virtually any assembly ratio could be used to obtain a nearly continuous variation in the average camber obtainable so as to easily customize each length of chain to the particular application. Correspondingly, different types of elements 50 could be used in a chain 10 to vary the minimum average radius obtainable over a length of the chain nearly continuously, so long as the radius and camber from side to side of the chain 10 at each pivot axis $P_1$ or $P_2$ is the same.

In the preferred embodiment, tie bars 90 (FIGS. 1-6, 7-19, 28 and 29) laterally span the spaced apart left and right sides of link plates 14 of the chain 10. The tie bars 90 rigidly connect the sides of the chain 10, and help support and constrain conduits carried by the chain 10 between them. As illustrated in FIG. 1, a tie bar 90 is provided on each transverse side of every other link 12 (i.e., one tie bar 90 on the top side and one on the bottom side of every other link 12 as viewed in FIG. 1). It should be understood that tie bars 90 could be provided on every link 12 or on fewer than every other link 12, if desired.

Midway between the ends 16 and 18, each link plate 14 defines a tie bar mounting structure 92 on each transverse side thereof including resilient hook fingers 93 and a nose 95 projecting transversely from outwardly facing plateau 96 between the hook fingers 93. Each hook finger 93 defines a lip surface 94 which faces transversely inwardly. Each nose 95 has a throughbore 97 extending laterally therethrough. Between the transversely opposed noses 95 of each link plate 14, hollow pockets 98 are formed so as to reduce the material thickness and avoid excessive shrinkage in molding the link plate 14.

Figure 17:
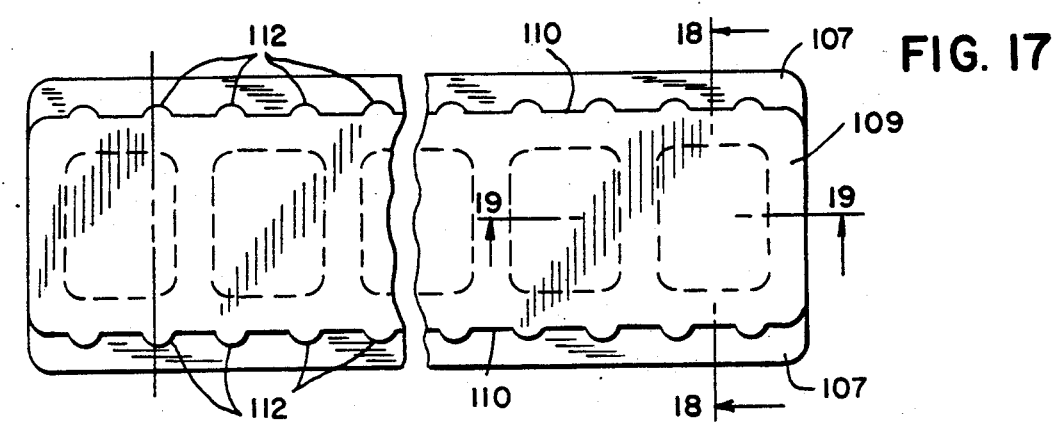
FIG. 17 is a top plan view of a tie bar for the conduit carrier chain of FIG. 1.
Figure 18:
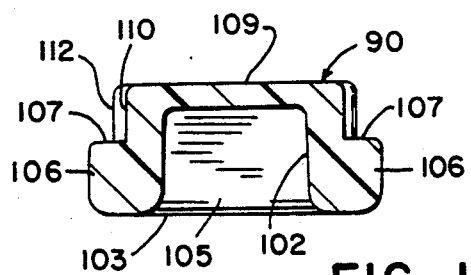
FIG. 18 is a sectional view taken along the plane of the line 18—18 of FIG. 17.
Figure 19:
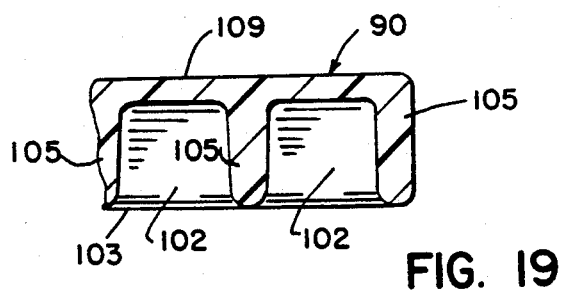
FIG. 19 is a fragmentary sectional view taken along the plane of the line 19—19 of FIG. 17.
Figure 20:
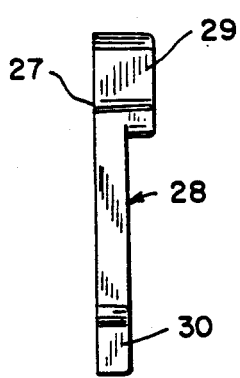
FIG. 20 is a front plan view of a spring clip for the conduit carrier chain of FIG. 1.
Figure 21:
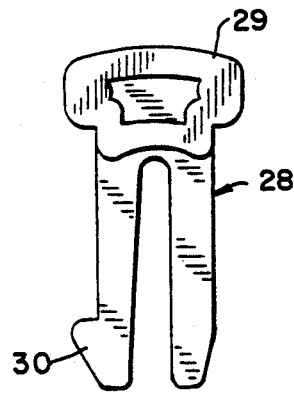
FIG. 21 is a side elevational view of the spring clip of FIG. 20.

Referring particularly to FIGS. 17-19, each tie bar 90 defines hollow pockets 102 opening to an inward side 103 thereof and divided laterally from one another by walls 105 Flanking the pockets 102 from the inward surface 103 to approximately halfway to the outward surface 109 are laterally extending flanges 106 which define transversely outwardly facing surfaces 107 Fore and aft side surfaces 110 extend transversely from surfaces 107 to outward surface 109 and define spaced apart detent ridges 112.

The tie bars 90 may be provided in any desired lengths, and cut off by the user to any length which is a multiple of the spacing between the pockets 102 to provide the width of chain 10 which the user desires, within the limits of the pocket 102 spacing. Should the user desire a width of chain 10 which is not a multiple of the spacing between the pockets 102, aluminum rods or other suitable spacers can be cut to the desired length, their ends tapped, and a screw inserted through bores 97 and threaded into the tapped ends to provide the desired width of chain.

The noses 95 of laterally spaced apart link plates 14 fit into pockets 102 of the tie bars 90. When a tie bar 90 is pushed down over a pair of noses on one transverse side of a link 12, the hook fingers 93 cam on the flanges 106 and snap behind the flanges 106 when their lips 94 clear surfaces 107. This locks the tie bar 90 to each of the link plates 14 to secure the spacing between the link plates.

Separators 120 can be provided which extend transversely between the two tie bars 90 of each link 12 on which tie bars are provided. The separators 120 provide different "compartments" for dividing conduits into groupings or otherwise arranging conduits between the tie bars 90. The separators 120 can be provided with holes 122 through which aluminum rods or other appropriate dividers can extend laterally to further compartmentalize the conduits in the transverse direction.

Figure 6:
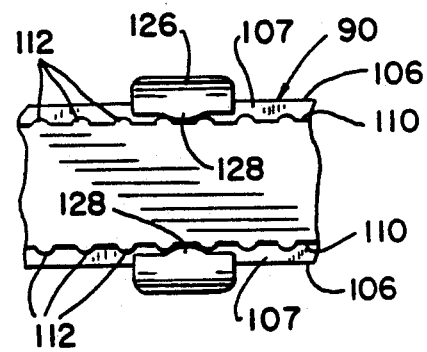
FIG. 6 is a bottom plan view illustrating the connection of the other end of a separator to a tie bar.

The separators 120 are slidable laterally along the tie bars 90 so as to vary the lateral sizes of the conduit compartments. The ends 125 and 126 of the separators 120 grasp the flanges 106 in a sliding fit. As best shown in FIG. 6, end 126 has opposed lobes 128 which provide a detent stop by interfering with the detent ridges 112. The end 126 is sufficiently resilient so as to flex when the lobes 128 are cammed over the ridges 112, but resist sliding of the separator 120 when the lobes 128 become nested in the spaces between ridges 112.

Figure 22:
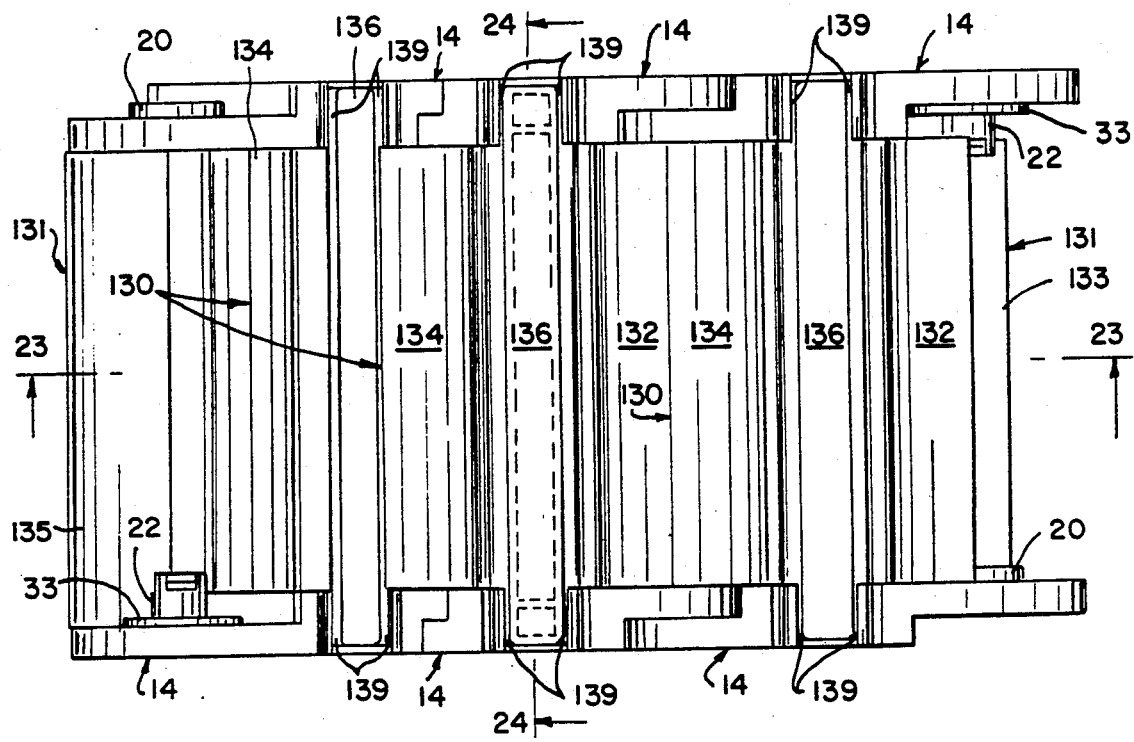
FIG. 22 is a top plan view of an enclosed embodiment of a conduit carrier chain of the invention.
Figure 23:
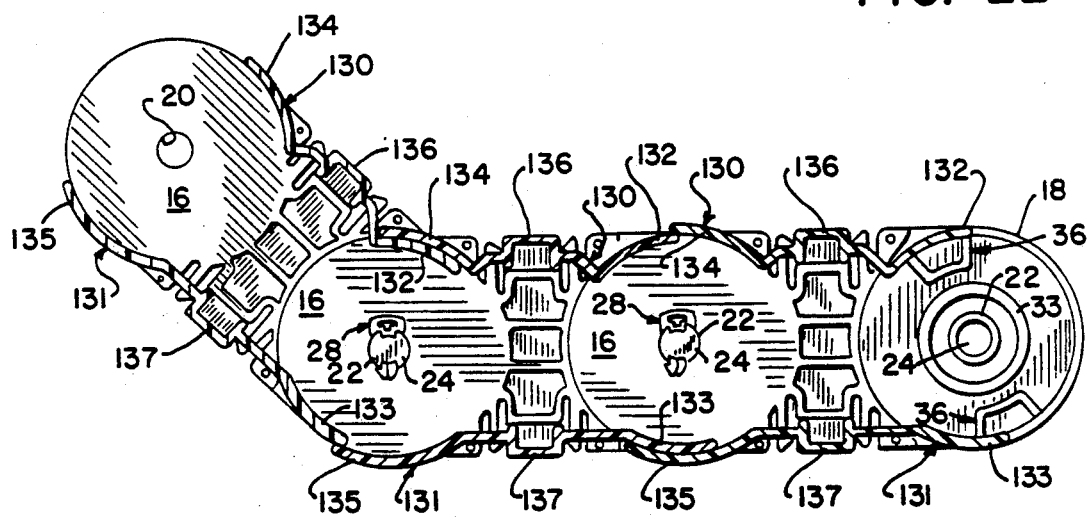
FIG. 23 is a sectional view taken along the plane of the line 23—23 of FIG. 22.
Figure 24:
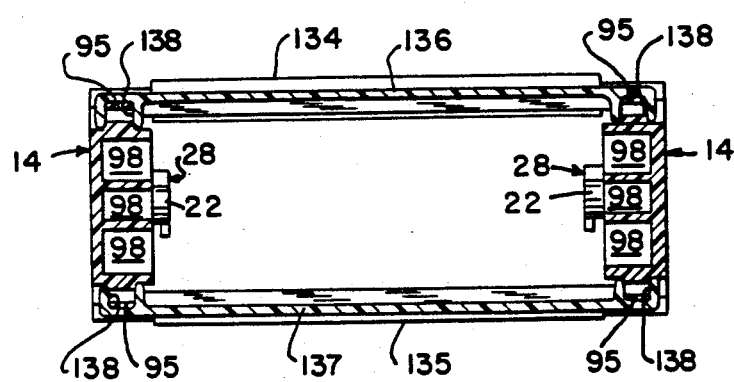
FIG. 24 is a sectional view taken along the plane of the line 24—24 of FIG. 22.

It is also possible to provide an enclosed cable carrier of the invention. Referring to FIGS. 22-24, one embodiment of such an enclosed cable carrier is disclosed. In this embodiment, all components are identical to the embodiment of FIGS. 1-21 except that instead of the tie bars 90 and separators 120, cover plates 130 and 131 span the link plates 14. The cover plates 130 are on the inside radius side of the chain 10 and the cover plates 131 are on the outside radius side of the chain. Each plate 130 has two arcuate ends 132 and 134 and a central section 136, and each plate 131 has two arcuate ends 133 and 135 and a central section 137. The lateral ends of the central sections 136 and 137 in cross section resemble the tie bars 90, having a pocket 138 which fits over the corresponding nose 95 and flanges defining surfaces 139 which are captured beneath lips 94 of hook fingers 93. A series of pockets 138 could also be provided as in the tie bars 90 so that the plates 130 and 131 could be custom cut to the desired width of chain. The ends 132 and 134 are arcuately sized and shaped to nest within one another and pivot in sliding surface contact about the corresponding pivot axis, as are the ends 133 and 135, to remain closed in all positions of the chain.

Figure 25:
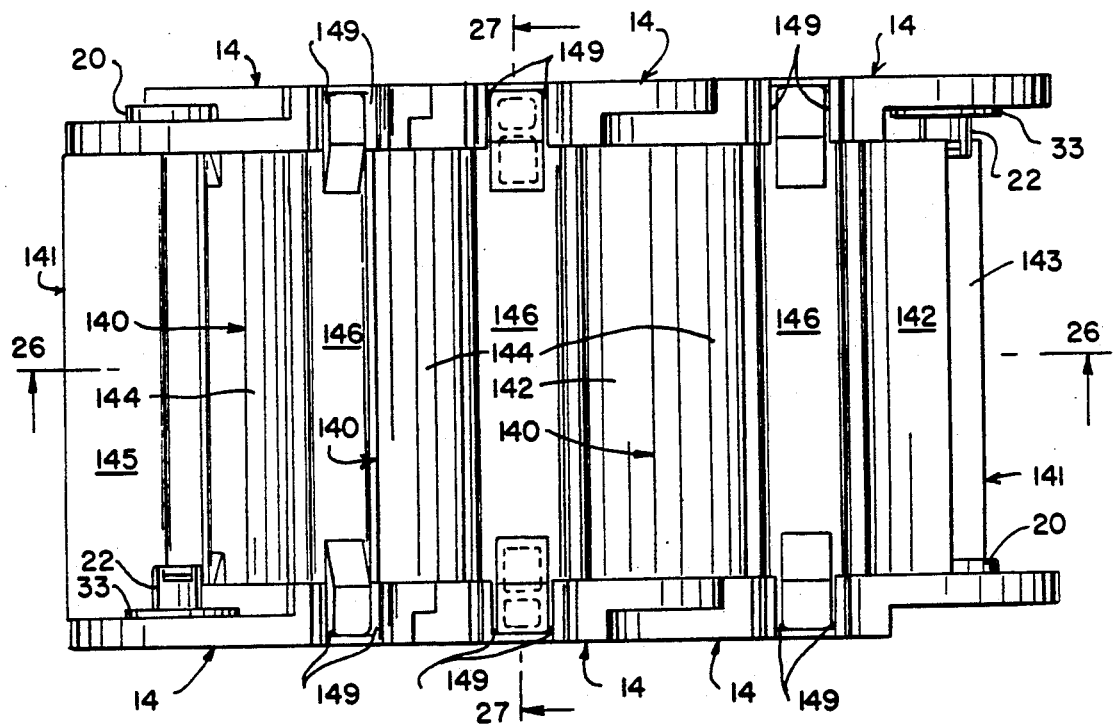
FIG. 25 is a top plan view of an alternate enclosed embodiment of a conduit carrier chain of the invention.
Figure 26:
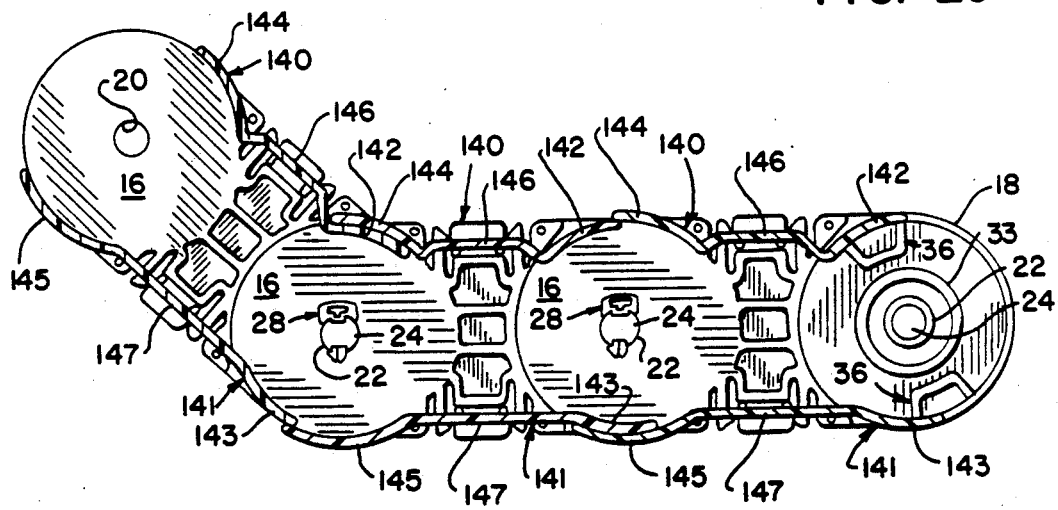
FIG. 26 is a sectional view taken along the plane of the line 26—26 of FIG. 25.
Figure 27:
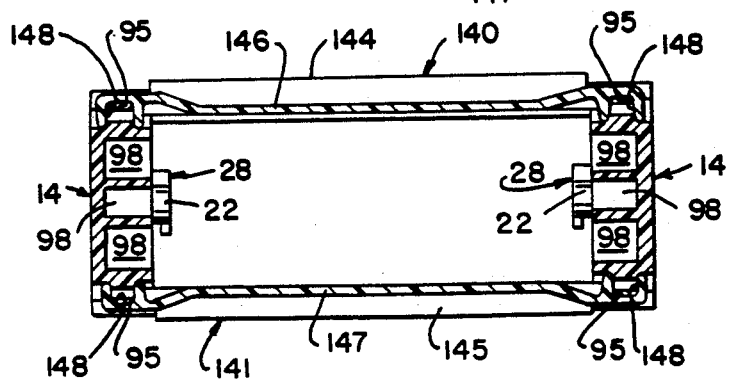
FIG. 27 is a sectional view taken along the plane of the line 27—27 of FIG. 25.

FIGS. 25-27 illustrate another embodiment of an enclosed cable carrier of the invention. This embodiment is substantially the same as the embodiment of FIGS. 22-24, except that its cover plates 140 and 141 are somewhat differently shaped from the cover plates 130 and 131 in their central sections 146 and 147. Other corresponding parts of the cover plates 140 and 141 are numbered with corresponding reference numerals, increased by 10.

Figure 28:
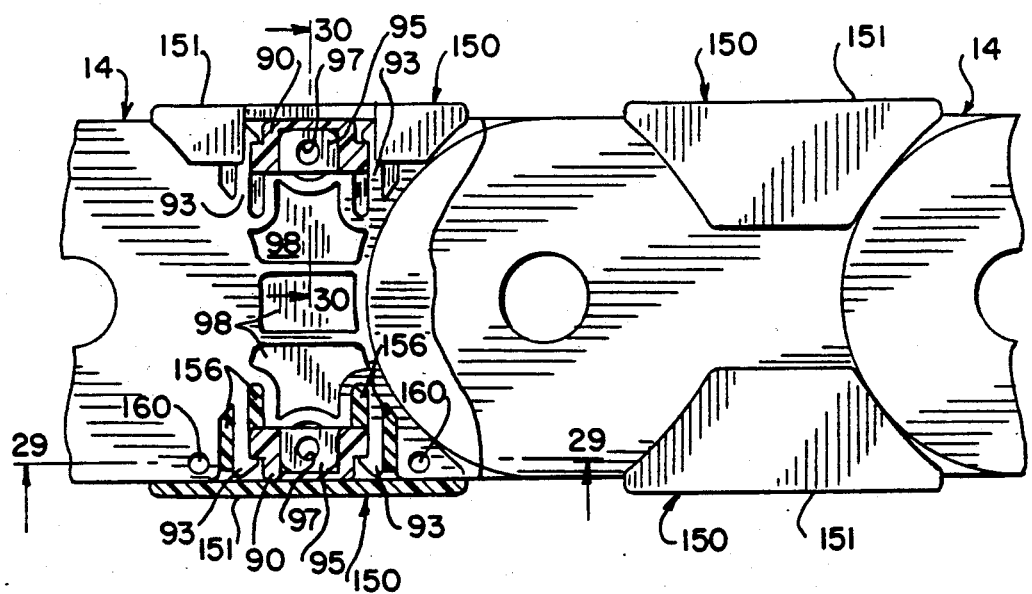
FIG. 28 is a side view of the conduit carrier chain of FIG. 1 with a portion broken away and further illustrating a skid shoe at the top of a link plate in elevation and a skid shoe at the bottom of the link plate with a portion broken away.
Figures 29, 30:
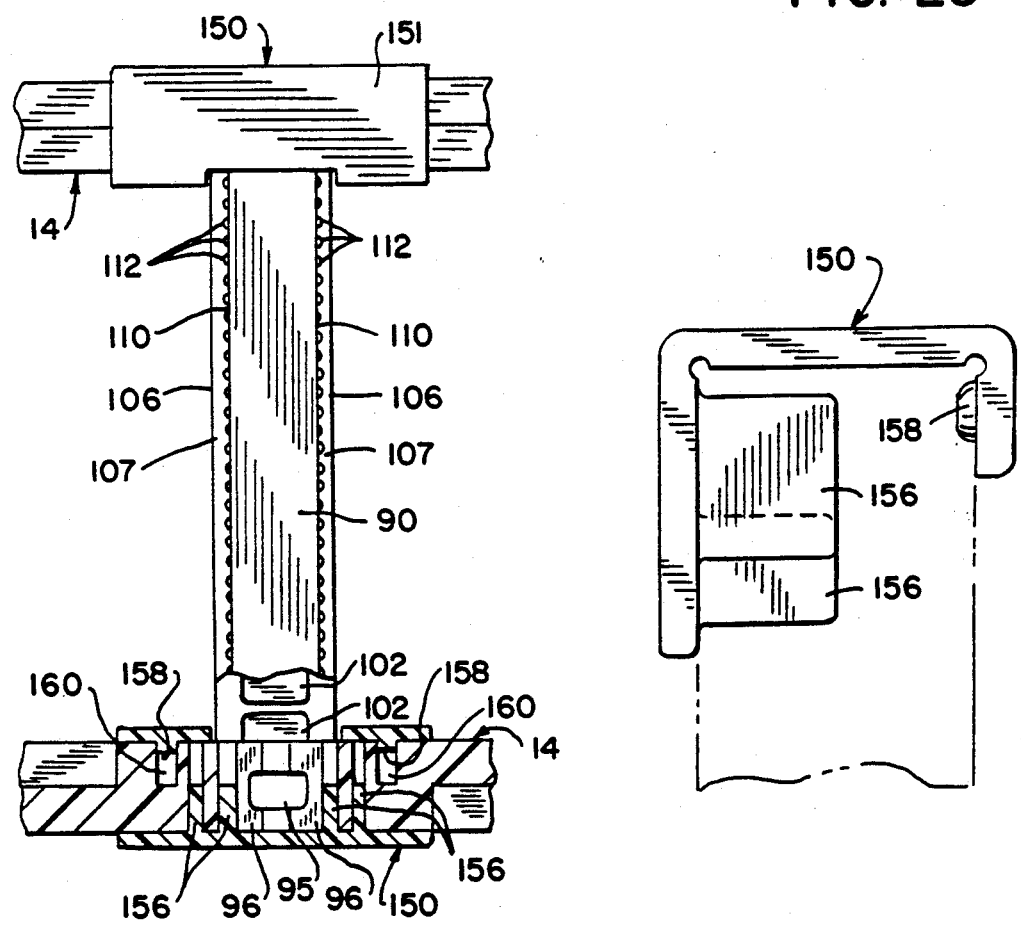
FIG. 29 is a top plan view of the conduit carrier chain of FIG. 28 with a portion broken away.
FIG. 30 is a front elevation view of a skid shoe for the conduit carrier chain of FIGS. 28 and 29.

FIGS. 28-29 illustrate a fourth embodiment of a cable carrier of the invention, in which skid shoes 150 are provided. The skid shoes 150 provide a bearing surface 151 which may be supported on a suitable surface. The skid shoes 150 may be desirable to use when the cable carrier chain 10 is heavily loaded and additional support is required. The skid shoes 150 may bear with their surfaces 151 along a support surface stationarily or in sliding contact.

Open spaces 155 are defined on each longitudinal side of the hook fingers 93. These spaces cause a weakening of the link plate 14 in this area, which can cause a link plate 14 to deflect excessively when it is heavily loaded. Thus, skid shoes 150 are provided with fins 156 which fit into the open spaces 155 to substantially fill these spaces longitudinally to reduce deflection of the link plate 14. The link plate 14 could also be stiffened in the area of the mounting structure 92 in other ways, for example, by affixing steel or other strong plates by screws threaded into holes 160 formed on the inside surface of the link plate 14.

Assembling a tie bar 90 to a link plate 14 helps secure a skid shoe 150 to the link plate 14, as it captures the two inside fins 156 beneath the tie bar 90. Also, skid plate 14 hooks over the inside surface of the link plate 14 and has dimples 158 which snap into the outer holes 160 (FIG. 9) formed on the inside surface of the link plate 14.

All of the components of a cable carrier of the invention can be molded from suitable plastic resins. In the preferred embodiments, all of the components except the stop elements 50, the skid shoes 150 and the spring clips 28 are molded from 50% glass filled nylon, which provides exceptional strength and rigidity. The spring clips 28 are molded from 30% glass filled nylon, which provides strength and added resilience. The stop elements 50 and skid shoes 150 are made of a dissimilar lubricious material, such as a 50% glass filled acetal plastic, to provide a relatively low coefficient of friction on their load-bearing, sliding surfaces.

Preferred embodiments of the invention have been described. Numerous modifications and variations of those embodiments will be apparent to those of skill in the art but which are still within the spirit and scope of the invention. Therefore, the invention should not be limited by the scope of the foregoing, but only by the claims that follow.

I claim:

1. A chain for carrying flexible conduit from one point to a relatively movable point, comprising:
   a plurality of links, each said link including at a lateral side thereof a link plate;
   each said link plate having a pair of opposed ends, each said end being connected to an end of a link plate on the corresponding side of an adjacent link to pivot relative to said adjacent link about a laterally extending axis; and
   a stop element between pivotally connected ends of end-to-end connected link plates, said stop element being separate and distinct from both said link plates and having a first lateral side interfitting with one said pivotally connected end and a second lateral side interfitting with the other said pivotally connected end, said element interfitting with said ends to limit angular motion between said ends about said laterally extending pivot axis;
   wherein each said stop element has a camber surface and a radius surface on each side thereof and each end has a camber surface for abutting the camber surface on the corresponding lateral side of the stop element in a straight position and a radius surface for abutting the radius surface on the corresponding lateral side of the stop element in a curved position.

2. A chain as in claim 1, wherein one each side of the stop element a camber surface is angularly spaced apart from a radius surface by a travel pocket, and the travel pocket on one side of the stop element differs in size or angular position from the travel pocket on the other side of the stop element.

3. A chain as in claim 2, wherein both sides of the stop element can interfit with either pivotally connected end.

4. A chain as in claim 3, wherein each side of the stop element defines a locator pocket between camber and radius surfaces on said side for closely interfitting with camber and radius surfaces on at least one pivotally connected end, said fit substantially preventing angular motion of the stop element relative to said end.

5. A chain as in claim 4, wherein camber and radius surfaces on each end are angularly positioned to engage the stop element in a locator pocket on one side thereof and in a travel pocket on the other side thereof.

6. A chain as in claim 5, wherein the locator pockets are angularly sized and positioned substantially identically from side to side of the stop element.

7. A chain as in claim 6, wherein the radius surfaces of the travel pockets are angularly positioned substantially identically from side to side of the stop element.

8. A chain as in claim 7, wherein the camber surfaces of the travel pockets from side to side of the stop element differ in angular position.

9. A chain as in claim 6, wherein the radius surfaces of the travel pockets from side to side of the stop element differ in angular position.

10. A chain as in claim 5, wherein each side of the stop element has two angularly opposed locator pockets and two angularly opposed travel pockets, and each end has camber and radius surfaces to fit into either both locator pockets or both travel pockets on the corresponding side of the stop element.

11. A kit for making a chain for carrying flexible conduit from one point to a relatively movable point, comprising:
 a plurality of link plates, each said link plate for making a link together with another laterally spaced apart link plate, and each said link plate including a pair of opposed ends, each said end for being connected to an end of a link plate on the corresponding side of an adjacent link to pivot relative to said adjacent link about a laterally extending axis; and
 a plurality of stop elements, each said stop element for being received between pivotally connected ends of end-to-end connected link plates, each said stop element being separate and distinct from said link plates and having a first lateral side for interfitting with one said pivotally connected end and a second lateral side for interfitting with the other said pivotally connected end, said element interfitting with said ends to limit angular motion between said ends about said laterally extending pivot axis; and
 a plurality of tie bars, each said tie bar extending laterally and having a plurality of pockets spaced along its length, and wherein each link plate further comprises a nose for fitting into said pockets extending transversely from each transverse side of each link plate and means for locking said tie bars over said noses.

12. A chain for carrying flexible conduit from one point to a relatively movable point, comprising:
 a plurality of links connected end to end, each said link including a pair of laterally spaced apart link plates;
 each of said link plates having a pair of longitudinally opposed ends, each said end being connected to an end of a link plate on the corresponding lateral side of the next adjacent link to pivot about a laterally extending axis and having a digit including a camber stop surface and a radius stop surface;
 a stop element between pivotally connected ends of the link plates, said stop element having two lateral sides, one side defining at least one locator pocket and the other side defining at least one travel pocket, each said pocket being defined by a camber stop surface and a radius stop surface;
 wherein each digit of the pivotally connected link plate ends is received within one of said pockets.

13. A chain as in claim 12, wherein the locator pocket receives a digit in a press fit and the travel pocket is substantially larger than the corresponding digit.

14. A chain as in claim 12, wherein each side of the stop element defines a locator pocket and a travel pocket, and the travel pockets from side to side differ in angular size.

15. A chain as in claim 14, wherein each side of the stop element defines two angularly opposed locator pockets and two angularly opposed travel pockets, and each end has two digits angularly positioned relative to one another to fit into the locator pockets or the travel pockets on the corresponding side of the stop element.

16. A chain as in claim 14, wherein the positions of the travel pocket camber stop surfaces from side to side of the stop element are angularly offset from one another.

17. A chain for carrying flexible conduit from one point to a relatively movable point, comprising:
 a plurality of links connected end to end, each said link having at least two laterally spaced apart sides;
 a plurality of link plates at each said side, each of said link plates having a pair of longitudinally opposed ends, each said end being connected to an end of a link plate on the corresponding lateral side of the next adjacent link to pivot about a laterally extending axis;
 a nose extending transversely from each transverse side of each said link plate of at least one said link;
 means spanning between the noses on each transverse side of said link, said means defining a pocket which fits closely over each said nose; and
 means for locking said spanning means over said noses.

18. A chain as in claim 17, wherein said spanning means is a tie bar having a plurality of pockets spaced along its length.

19. A chain as in claim 18, wherein said spanning means is a cover for closing said chain.

* * * * *